(12) United States Patent
Keating et al.

(10) Patent No.: US 8,905,815 B2
(45) Date of Patent: Dec. 9, 2014

(54) RACING VEHICLE GAME

(75) Inventors: David Alan Keating, Essex (GB);
James Edward Alexander Wyatt, East Sussex (GB)

(73) Assignee: China Industries Limited, Wolverhampton (GB)

( * ) Notice: Subject to any disclaimer, the term of this patent is extended or adjusted under 35 U.S.C. 154(b) by 108 days.

(21) Appl. No.: 13/810,873

(22) PCT Filed: Jul. 19, 2011

(86) PCT No.: PCT/GB2011/051365
§ 371 (c)(1),
(2), (4) Date: Mar. 26, 2013

(87) PCT Pub. No.: WO2012/010890
PCT Pub. Date: Jan. 26, 2012

(65) Prior Publication Data
US 2013/0172060 A1     Jul. 4, 2013

(30) Foreign Application Priority Data

Jul. 19, 2010    (GB) .................................. 1012058.2

(51) Int. Cl.
| | | |
|---|---|---|
| *G05D 1/00* | (2006.01) | |
| *G05D 1/02* | (2006.01) | |
| *A63F 9/14* | (2006.01) | |
| *A63H 18/16* | (2006.01) | |
| *A63H 17/395* | (2006.01) | |

(52) U.S. Cl.
CPC .............. *A63F 9/143* (2013.01); *G05D 1/0244* (2013.01); *G05D 2201/0214* (2013.01); *G05D 1/0272* (2013.01); *A63H 18/16* (2013.01); *A63H 17/395* (2013.01)
USPC .......................................................... 446/454

(58) Field of Classification Search
CPC ....... A63H 17/395; A63H 18/16; A63F 9/143
USPC .......................................... 446/175, 454–456
See application file for complete search history.

(56) References Cited

U.S. PATENT DOCUMENTS

| | | | |
|---|---|---|---|
| 3,942,087 | A | 3/1976 | Maisch et al. |
| 4,307,329 | A | 12/1981 | Taylor |

(Continued)

FOREIGN PATENT DOCUMENTS

| | | |
|---|---|---|
| CN | 201353430 Y | 12/2009 |
| EP | 0055304 A1 | 7/1982 |

(Continued)

OTHER PUBLICATIONS

International Search Report and Written Opinion dated Nov. 11, 2011 from International Patent Application No. PCT/GB2011/051365 filed Jul. 19, 2011 (9 pages).

(Continued)

*Primary Examiner* — Corbett B Coburn
(74) *Attorney, Agent, or Firm* — Sunstone IP

(57) ABSTRACT

A method and apparatus for controlling the position of a vehicle on a track so as to provide a slotless racing vehicle game is described. The method involves measuring the lateral position of the vehicle on the track so as to minimize the distance with a user defined lateral position. A measured velocity of the vehicle is then feedback to a steering servo in order to stabilize the vehicle's position at the desired lateral position. In particular, the gain of a controller that generates the input signal for the steering servo is varied with the reciprocal of the square of the speed of the vehicle.

18 Claims, 7 Drawing Sheets

(56) References Cited

U.S. PATENT DOCUMENTS

| | | | |
|---|---|---|---|
| 4,576,246 A | 3/1986 | Stieber et al. | |
| 5,765,116 A | 6/1998 | Wilson-Jones et al. | |
| 2002/0113564 A1* | 8/2002 | Reile et al. | 318/139 |
| 2004/0158375 A1* | 8/2004 | Tsutsumi et al. | 701/41 |
| 2006/0041356 A1* | 2/2006 | Shirato et al. | 701/41 |
| 2008/0083346 A1* | 4/2008 | Fiske et al. | 104/283 |
| 2008/0091318 A1 | 4/2008 | Deng et al. | |
| 2010/0035684 A1 | 2/2010 | Kotlarik et al. | |
| 2010/0138112 A1* | 6/2010 | Suzuki et al. | 701/42 |
| 2010/0235035 A1* | 9/2010 | Nishira et al. | 701/29 |

FOREIGN PATENT DOCUMENTS

| | | |
|---|---|---|
| EP | 0479271 A2 | 4/1992 |
| EP | 2044990 A1 | 4/2009 |
| GB | 2419541 A | 5/2006 |
| GB | 2444102 A | 5/2008 |
| JP | 54-100031 | 7/1979 |

OTHER PUBLICATIONS

Combined Exam and Search Report dated Oct. 22, 2010 from European Patent Application No. GB1012058.2 filed Jul. 19, 2010 (4 pages).

Exam Report dated Aug. 23, 2011 from European Patent Application No. GB1012058.2 filed Jul. 19, 2010 (3 pages).

Exam Report dated Nov. 1, 2012 from European Patent Application No. GB1012058.2 filed Jul. 19, 2010 (2 pages).

* cited by examiner

RACING VEHICLE GAME

The present invention relates to the field of racing vehicle games. More specifically, the present invention concerns methods for controlling the position of a vehicle on a track so as to provide a slotless racing vehicle game.

Traditionally, racing vehicle games involve the racing of model slot cars. Each car comprises a guide peg (or swiveling blade) that is configured to locate within a guide slot within a track that acts to define a lane for the car. Power for the car's low-voltage electric motor is carried by metal strips located next to the slot and is picked up by contacts located at the front of the car alongside the guide peg. The voltage used to power the car can be varied by an operator changing a resistance value within a corresponding hand controller.

It is known to also incorporate optional features such as braking elements, electronic control devices and/or traction magnets to assist in the operation of the slot car. More recently, digital technology has been developed which allows for more than one slot car to share a lane.

The challenge in racing slot cars comes in the taking of curves and other obstacles at the highest speed that will not cause the car to lose its grip and spin sideways, or to "de-slot", leaving the track all together. Although, the actual model cars and tracks can accurately replicate corresponding full scale vehicles and racing circuits the realism of racing model slot cars is severely limited by the inflexibility of the guide peg and the slots. Thus, unlike normal racing, variable positions across the width of a track cannot be adopted by the operator of the model car in order to gain a tactical advantage or to protect a racing line. In addition, there is no facility with traditional slotted tracks to incorporate additional racing hazards such as oil slicks, gravel pits or variable weather conditions.

It is recognised in the present invention that considerable advantage is to be gained in the provision of a slotless racing vehicle game.

It is therefore an object of an aspect of the present invention to obviate or at least mitigate the foregoing disadvantages of the racing vehicle games known in the art.

SUMMARY OF INVENTION

According to a first aspect of the present invention there is provided a method for controlling the position of a vehicle on a track wherein the method comprises the steps of:
taking a first measurement of a lateral position of the vehicle on the track;
comparing the first measured lateral position with a desired lateral position for the vehicle so as to produce an error signal;
generating a first input signal for a steering servo of the vehicle so as to minimise the error signal;
measuring the speed of the vehicle;
employing the measured speed so as to compensate for speed dependent changes in a response of the vehicle to an output signal from the steering servo.

Preferably the step of taking the first measurement is carried out at the front of the vehicle. This step may comprise employing an optical sensor so as to measure light reflected from the track.

The step of measuring the speed of the vehicle may comprise measuring the back emf generated by a motor employed to drive the vehicle.

The step of compensating for speed dependent changes in the response of the vehicle comprises varying the gain of a controller that generates the first input signal for the steering servo.

It is preferable for the gain of the controller to be varied with the reciprocal of the square of the speed of the vehicle. In an alternative embodiment the gain of the controller is varied with the reciprocal of the square of the speed of the vehicle when the speed of the vehicle is above a predetermined value.

The method for controlling the position of the vehicle on the track may further comprise the step of measuring the angle between the direction of propagation of the vehicle and a longitudinal axis of the track.

The method for controlling the position of the vehicle on the track may further comprise the step generating a second input signal for the steering servo so as to minimise the measured angle.

The step of measuring the angle between the direction of propagation of the vehicle and a longitudinal axis of the track may comprise taking a second measurement of a lateral position of the vehicle on the track.

Preferably the step of taking the second measurement is carried out at the rear of the vehicle. This step may comprise employing an optical sensor so as to measure light reflected from the track.

The step of measuring the angle between the direction of propagation of the vehicle and a longitudinal axis of the track may further comprise taking the second measurement of the lateral position of the vehicle on the track from the first measurement of the lateral position of the vehicle on the track.

According to a second aspect of the present invention there is provided a method for controlling the position of a vehicle on a track wherein the method comprises the steps of:
taking a first measurement of a lateral position of the vehicle on the track;
comparing the first measured lateral position with a desired lateral position for the vehicle so as to produce an error signal;
generating a first input signal for a steering servo of the vehicle so as to minimise the error signal;
measuring the angle between the direction of propagation of the vehicle and a longitudinal axis of the track; and
generating a second input signal for the steering servo so as to minimise the measured angle.

The error signal is preferably minimised within a primary feedback loop of the steering servo, the primary feedback loop having a first responsivity (Ks). The measured angle is preferably minimised within a secondary feedback loop of the steering servo, the secondary feedback loop having a second responsivity (Klf2).

Preferably the second responsivity (Klf2) is equal to the reciprocal of the responsivity of the steering servo (Kss). Setting the second responsivity (Klf2) to be equal to the reciprocal of the responsivity (Kss) of the steering servo is found to significantly increase the stability of the positional control of the vehicle on the track.

Preferably the step of taking the first measurement is carried out at the front of the vehicle. This step may comprise employing an optical sensor so as to measure light reflected from the track.

The step of measuring the angle between the direction of propagation of the vehicle and a longitudinal axis of the track may comprise taking a second measurement of a lateral position of the vehicle on the track.

Preferably the step of taking the second measurement is carried out at the rear of the vehicle. This step may comprise employing an optical sensor so as to measure light reflected from the track.

The step of measuring the angle between the direction of propagation of the vehicle and a longitudinal axis of the track may further comprise taking the second measurement of the lateral position of the vehicle on the track from the first measurement of the lateral position of the vehicle on the track.

The method for controlling the position of the vehicle on the track may further comprise the step of measuring the speed of the vehicle.

Preferably the measured speed is employed to compensate for speed dependent changes in a response of the vehicle to an output signal from the steering servo.

The step of compensating for speed dependent changes in the response of the vehicle comprises varying the gain of a controller that generates the first input signal for the steering servo. This step may further comprise varying the gain of a controller that generates the second input signal for the steering servo.

It is preferable for the gain of feedback controller to be varied with the reciprocal of the speed of the vehicle. In an alternative embodiment the gain of a controller is varied with the reciprocal of the speed of the vehicle when the speed of the vehicle is above a predetermined value.

Embodiments of the second aspect of the invention may comprise features to implement the preferred or optional features of the first aspect of the invention or vice versa.

According to a third aspect of the present invention there is provided a method for controlling the position of a vehicle on a track wherein the method comprises the steps of:
- taking a first measurement of a lateral position of the vehicle on the track;
- comparing the first measured lateral position with a desired lateral position for the vehicle so as to produce an error signal;
- generating a first input signal for a steering servo of the vehicle so as to minimise the error signal;
- measuring the angle between the direction of propagation of the vehicle and a longitudinal axis of the track;
- generating a second input signal for the steering servo so as to minimise the measured angle;
- measuring the speed of the vehicle; and
- employing the measured speed so as to compensate for speed dependent changes in a response of the vehicle to an output signal from the steering servo.

Embodiments of the third aspect of the invention may comprise features to implement the preferred or optional features of the first or second aspects of the invention or vice versa.

According to a fourth aspect of the present invention there is provided a racing track suitable for racing one or more vehicles wherein the racing track comprises an optically graded lateral profile.

The optically graded profile thus provides each lateral position of the track with a unique level of reflectivity.

Preferably the optically graded lateral profile is maintained along a length of the track.

Most preferably the racing track comprises a closed loop track.

Preferably the optically graded lateral profile moves from regions of low reflectivity at the inside of the track to regions of high reflectivity towards at the outside of the track.

The optically graded lateral profile may be greyscale, coloured or formed from an non-visible reflecting material e.g. an infra-red reflecting material.

The racing track may comprise paper with the optically graded lateral profile printed thereon. As a result the racing track can be rolled up or folded for storage or transport purposes and then simply rolled out or unfolded as and when required.

The track may comprise separate track sections adapted to be fitted together. Such an embodiment allows for racing tracks of different designs to be set up by a user through the reconfiguration of the track sections.

The track may further comprise one or more markings. The markings may be designed to be read by an optical sensor, or to obscure the reading process of an optical sensor. In this way the markings facilitate additional information e.g. lap times; to simulate hazards e.g. oil slicks, track debris, gravel pits; or to simulate changing handling conditions requiring a vehicle to make a pit stop e.g. a vehicle puncture or changing weather conditions.

According to a fifth aspect of the present invention there is provided a control circuit for controlling the position of a vehicle on a track wherein the control circuit comprises:
- a measurement sensor for measuring a first lateral position of the vehicle on the track;
- a subtractor employed to produce an error signal by comparing the first measured lateral position with a desired lateral position for the vehicle;
- a controller for generating a first input signal for a steering servo of the vehicle so as to minimise the error signal;
- velocity sensor for measuring the speed of the vehicle;
- wherein the controller provides a means for employing the measured speed so as to compensate for speed dependent changes in a response of the vehicle to an output signal from the steering servo.

Preferably the control circuit further comprises a second measurement sensor for measuring the angle between the direction of propagation of the vehicle and a longitudinal axis of the track. In this embodiment the controller also generates a second input signal for the steering servo so as to minimise the measured angle.

Embodiments of the fifth aspect of the invention may comprise features to implement the preferred or optional features of the first and second aspects of the invention or vice versa.

According to a sixth aspect of the present invention there is provided a control circuit for controlling the position of a vehicle on a track wherein the control circuit comprises:
- a measurement sensor for measuring a first lateral position of the vehicle on the track;
- a subtractor employed to produce an error signal by comparing the first measured lateral position with a desired lateral position for the vehicle;
- a controller for generating a first input signal for a steering servo of the vehicle so as to minimise the error signal;
- a second measurement sensor for measuring the angle between the direction of propagation of the vehicle and a longitudinal axis of the track; and
- wherein the controller generates a second input signal for the steering servo so as to minimise the measured angle.

The first input signal for the steering servo is preferably generated within a primary feedback loop of the steering servo, the primary feedback loop having a first responsivity (Ks). The second input signal for the steering servo is preferably generated within a secondary feedback loop of the steering servo, the secondary feedback loop having a second responsivity (Klf2).

Preferably the second responsivity (Klf2) is equal to the reciprocal of a responsivity (Kss) of the steering servo. Setting the second responsivity (Klf2) to be equal to the reciprocal of the responsivity (Kss) of the steering servo is found to significantly increase the stability of the positional control of the vehicle on the track.

Preferably the control circuit further comprises a velocity sensor for measuring the speed of the vehicle. In this embodiment the controller also provides a means for employing the measured speed so as to compensate for speed dependent changes in a response of the vehicle to an output signal from the steering servo.

Preferably a variation of the gain of the controller when generating the first input signal provides the means for employing the measured speed so as to compensate for speed dependent changes in a response of the vehicle to an output signal from the steering servo. Similarly a variation of the gain of the controller when generating the second input signal provides the means for employing the measured speed so as to compensate for speed dependent changes in a response of the vehicle to an output signal from the steering servo.

Preferably the gain of the controller is varied with the reciprocal of the speed of the vehicle.

Embodiments of the sixth aspect of the invention may comprise features to implement the preferred or optional features of the first and second aspects of the invention or vice versa.

According to a seventh aspect of the present invention there is provide a racing vehicle wherein the racing vehicle comprises a control circuit in accordance with the fifth aspect of the present invention.

According to an eighth aspect of the present invention there is provide a racing vehicle wherein the racing vehicle comprises a control circuit in accordance with the sixth aspect of the present invention.

BRIEF DESCRIPTION OF DRAWINGS

Aspects and advantages of the present invention will become apparent upon reading the following detailed description and upon reference to the following drawings in which.

DETAILED DESCRIPTION

Figure 1:
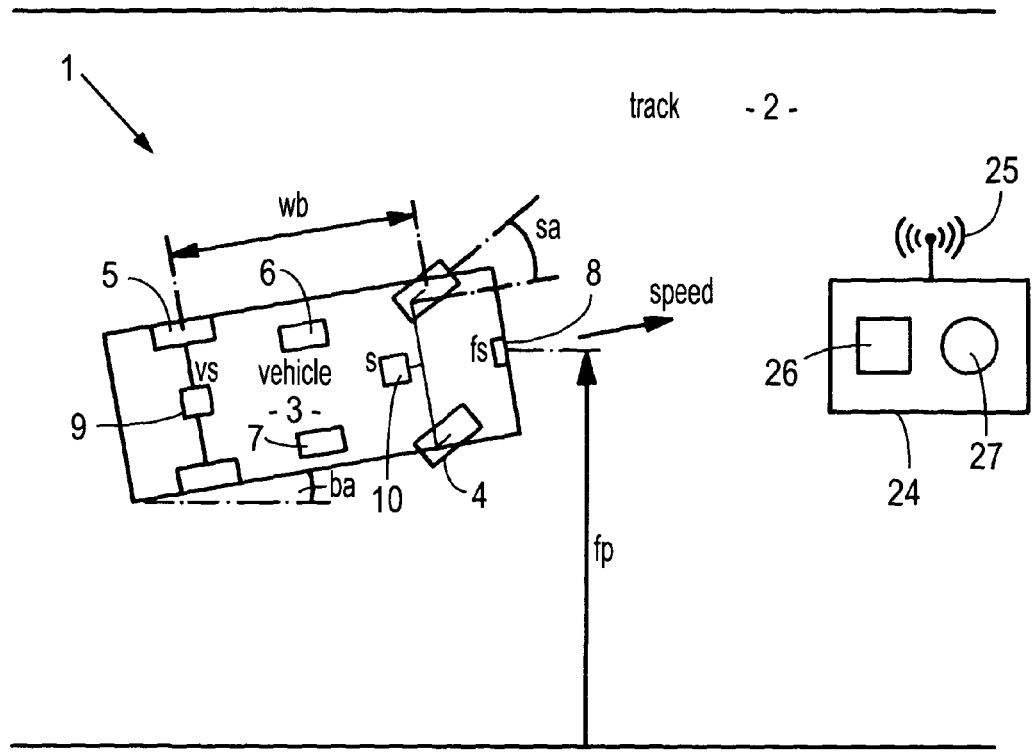
FIG. 1 presents a schematic representation of a vehicle in accordance with an embodiment of the present invention.

FIG. 1 presents a schematic representation of a vehicle 1 in accordance with an embodiment of the present invention. The vehicle 1 is shown on a racing track 2, further details of the track 2 being described below with reference to FIG. 4.

The vehicle 1 can be seen to comprise a main body 3 at the front of which is mounted a set of steerable wheels 4 and to the rear of which is mounted a set of non-steerable wheels 5. Power for the vehicle is provided via a dc electric motor 6 configured to drive the non-steerable wheels 5. A first controller unit 7, for example a proportional-integral-derivative controller (PID controller), provides a means for an operator to remotely control the vehicle 1. A first optical sensor 8 is positioned at the front of the vehicle 1 in order to provide a means for determining the position of the vehicle 1 on the track 2. A velocity sensor 9 is located at the non-steerable wheels 5 and is employed to provide a means for measuring the speed of the vehicle 1. The steering angle (sa), and thus the direction of travel of the vehicle 1, is controlled by a steering servo (s) 10 which is located within a closed loop. The steering servo 10 exhibits a responsivity denoted by Kss.

Figure 2:
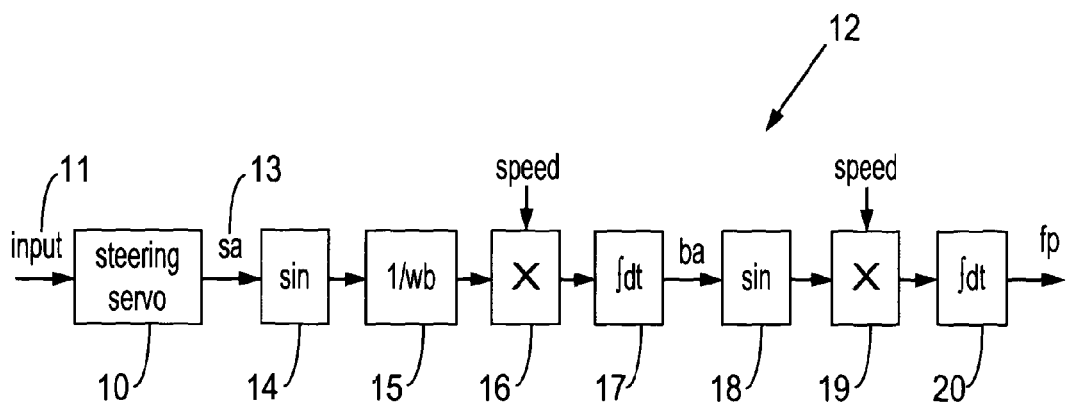
FIG. 2 presents a block diagram showing the response of the vehicle of FIG. 1 to steering commands.

The way in which the position of the front of the vehicle (fp) across the track 2 is affected by the input signal 11 to the steering servo (s) 10 is represented by the block diagram 12 of FIG. 2. In particular, the input signal 11 to the system (Input) is the signal fed to the steering servo (s) 10 which may take a number of forms, for example an analogue voltage, a pulse of certain width, or a binary number within a microcontroller. The output signal 13 from the steering servo (s) 10 represents the steering angle (sa) which results.

When an input signal 11 of a certain amplitude is applied to the steering servo (s) 10 it causes the steerable wheels 4 to rotate to an angle relative to the body 3 of the vehicle 1. Thus, while the vehicle 1 is moving forward at a certain speed (speed), the angle of the body 3 of the vehicle 1 to the track 2, the body angle (ba), will continually increase. It will be appreciated that the longer the wheelbase (wb) of the vehicle 1, the smaller the effect of the steering angle (sa) will be. Furthermore, the greater the speed at which the vehicle 1 is travelling the faster the body angle will change for a given steering angle (sa). These aspects are represented by the various blocks presented in FIG. 2, as described in further detail below.

The output of the first sine block 14 is the sine of the input to that block, in other words it is the sine of the steering angle (sa). The block marked 1/wb 15 shows that the effect is inversely proportional to the wheelbase (wb) of the vehicle 1. The fact that the steering angle (sa) is proportional to the speed of the vehicle 1 is shown by the first multiplier block 16, with speed being provided as a secondary input. Finally, the fact that a fixed steering angle (sa) causes the body angle (ba) to continually increase, indicates the presence of a time integral action which is represented by the presence of the first, time integral block 17.

Once the input signal 11 has returned to zero the steerable wheels 4 will once more be aligned with the body 3 and so the body angle (ba) will remain at its current value. This non-zero value of the body angle (ba) will, however, cause the position of the front of the vehicle (fp) to continually increase. The rate of increase is once again proportional to speed, and again it is the sine of the body angle (ba) that is significant. These effects are shown by the remaining blocks of the block diagram 12 of FIG. 2, namely the second sine block 18, the second multiplier block 19 and the second, time integral block 20.

Figure 3A:
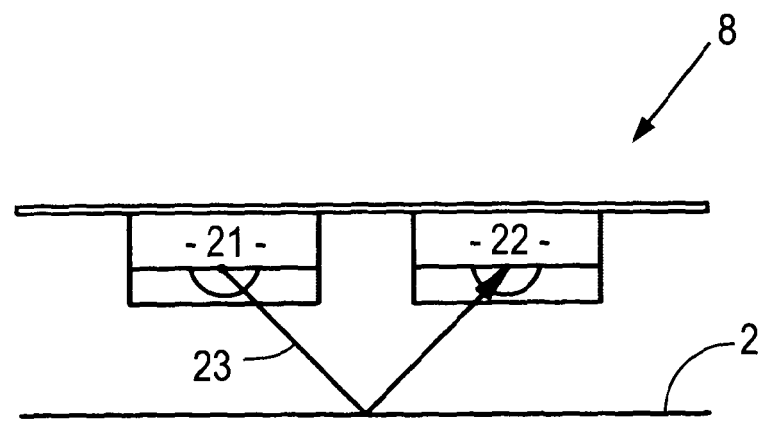
FIG. 3 presents:
(a) a schematic representation of an optical sensor employed by the vehicle of FIG. 1; and
(b) an electronic circuit of the optical sensor.
Figure 3B:
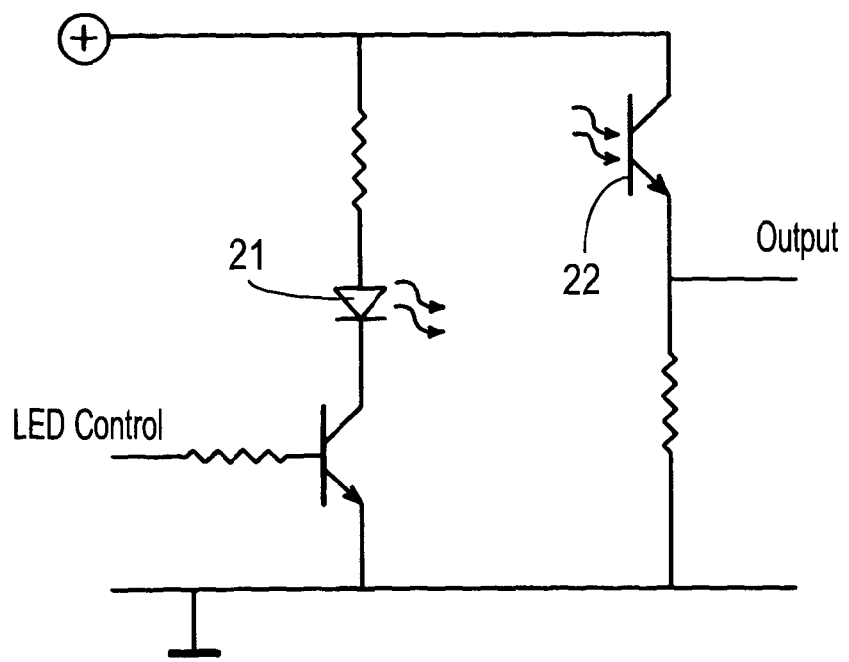

Further details of the optical sensor 8 employed by the vehicle 1 are presented in FIG. 3. In particular, FIG. 3(*a*) presents a schematic representation of the optical sensor 8 while FIG. 3(*b*) presents an electrical circuit for this component. The optical sensor 8 can be seen to comprise a light source 21 in the form of an LED and a detector 22 in the form of a phototransistor. Light 23 emitted by the light source 21 is initially directed towards the track 2. Following reflection from the track 2 the light 23 is then incident upon the detector 22. As explained in further detail below, the level of the light detected provides a diagnostic for measuring the position of the vehicle 1 across the width of the track 2.

The following method may be employed to compensate the optical sensor 8 for the effects of background light. The light source 21 may be turned off so as to allow a reading to be taken by detector 22. This reading can be accounted for by the presence of ambient light. By subtracting this reading from those recorded during the course of a race allows for the effects of ambient light to be removed from the vehicle control systems described in further detail below.

The velocity sensor 9 provides a means for measuring the speed of the vehicle 1 by employing a technique whereby the back emf of the dc electric motor 6 is measured. During normal operation the dc electric motor 6 draws electrical energy and converts it into mechanical energy in order to drive the vehicle 1. When the power to the dc electric motor 6 is interrupted the dc electric motor 6 acts as an electrical generator and the above process is reversed i.e. the dc electric motor 6 takes mechanical energy and converts it into electrical energy. The voltage observed when the dc electric motor 6 is operating as an electrical generator is directly proportional to the speed of the dc electric motor 6. Thus by periodically interrupting the electrical supply to the dc electric motor 6 (typically for a period of a few milliseconds) the velocity sensor 9 can be used to measure the speed of the vehicle 1 without significant disruption to the drive of the vehicle 1.

A remote control unit 24 provides an operator with the means for generating a command signal 25 for controlling the speed and lateral position of the vehicle 1 on the track 2. In particular, the remote control unit 24 comprises a throttle 26 which provides a means for generating a speed control component for the command signal 25 and a steering wheel 27, or joystick, which provides a means for generating a track position component for the command signal.

Racing Track

Figure 4:
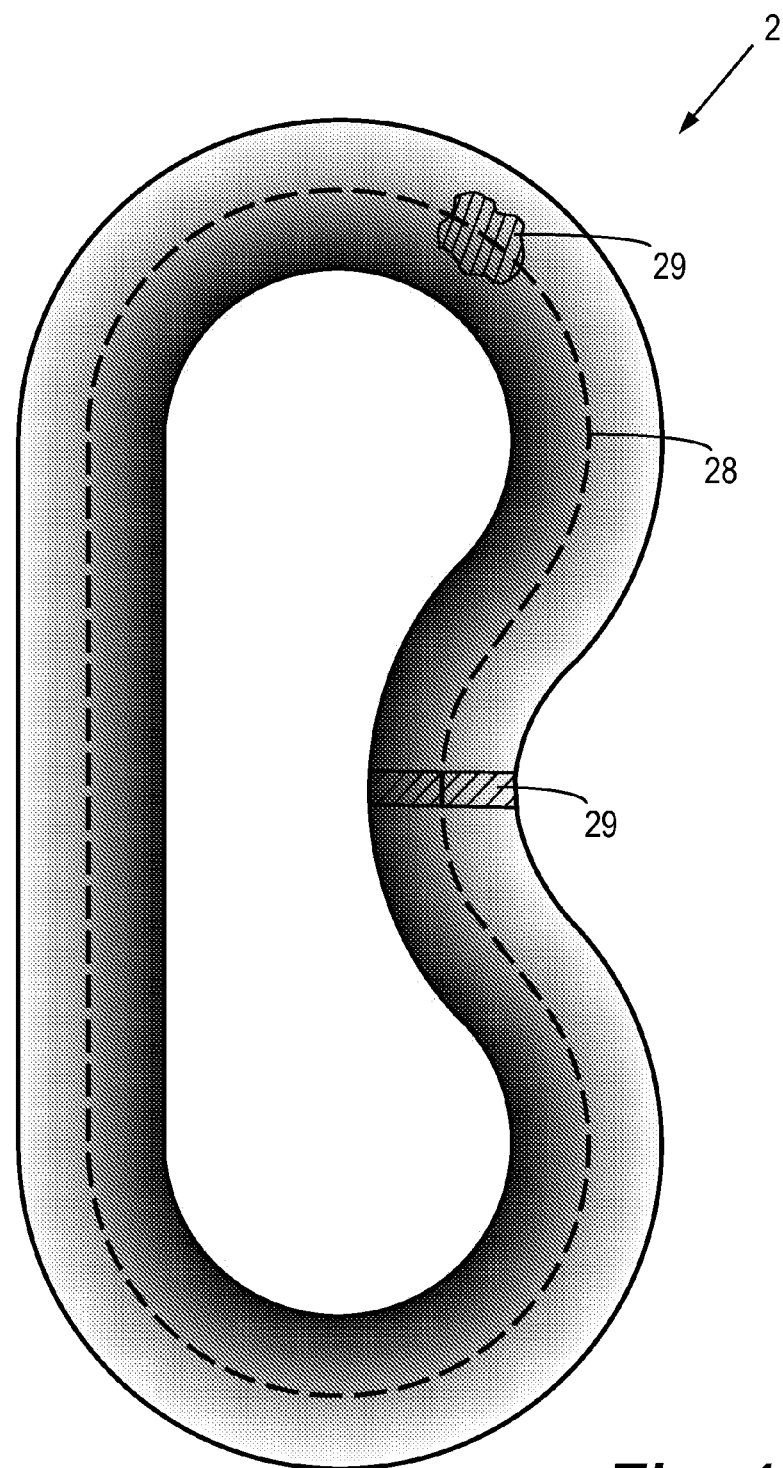
FIG. 4 presents a plan view of an example racing track for the vehicle of FIG. 1.

A plan view of an example racing track 2 for the vehicle 1 is presented in FIG. 4. In the presently described embodiment the racing track 2 can be seen to form a closed loop. Reference to a longitudinal axis 28 of the track relates to an axis which extends around the length of the track, as illustrated by the dashed line presented in FIG. 4, while reference to lateral movement of a vehicle 1 on the track 2 or lateral profile refers to movement or a profile substantially perpendicular to the longitudinal axis 28.

The width of the track 2 is formed so as to exhibit an optically graded lateral profile that is maintained along the length of the track 2. The optically graded profile thus provides a means for allocating each lateral position of the track 2 with a unique level of reflectivity. In the presently described example the optically graded lateral profile comprises a grey-scale profile (i.e. black to white) from the inside of the track 2 to the outside, so as to provide corresponding regions of relatively low reflectivity to high reflectivity for the light source 21 of the optical sensor 8. In this way the level of light 23 reflected onto the detector 22 from the light source 21 corresponds to a unique lateral position and thus provides a diagnostic for determining the lateral position of the front of the vehicle (fp) on the track 2 and thereafter for maintaining this lateral position along the full length of the track 2.

It will be appreciated by those skilled in the art that the racing track 2 need not necessarily comprise a greyscale, optically graded lateral profile. The track may be formed from any suitable colour providing that corresponding regions of relatively low reflectivity to high reflectivity for the optical sensor 8 can be formed. Furthermore, the track 2 need not comprise a visible colour at all, but may instead be formed from an infra red reflecting material with a corresponding infra red light source 21 being employed within the optical sensor 8.

It is preferable for the track 2 to be formed by a printing process whereby appropriate ink is applied to a thin paper. As a result the racing track 2 can be rolled up or folded for storage or transport purposes and then simply rolled out or unfolded as and when required.

The track 2 may be printed on separate paper sections and then laid out as appropriate when required for a race to take place. Such an embodiment would allow for racing tracks 2 of different designs to be set up by a user through the reconfiguration of the track sections.

It will also be appreciated by those skilled in the art that additional markings 29 may be incorporated within the track 2. These additional markings 29 may be designed to be read by the optical sensor 8, or to obscure the reading process of the optical sensor 8, so as to facilitate additional information e.g. lap timings; to simulate hazards e.g. oil slicks, track debris, gravel pits; or to simulate changing handling conditions requiring a vehicle to make a pit stop e.g. a vehicle puncture or changing weather conditions.

Velocity Sensor Control System

Figure 5:
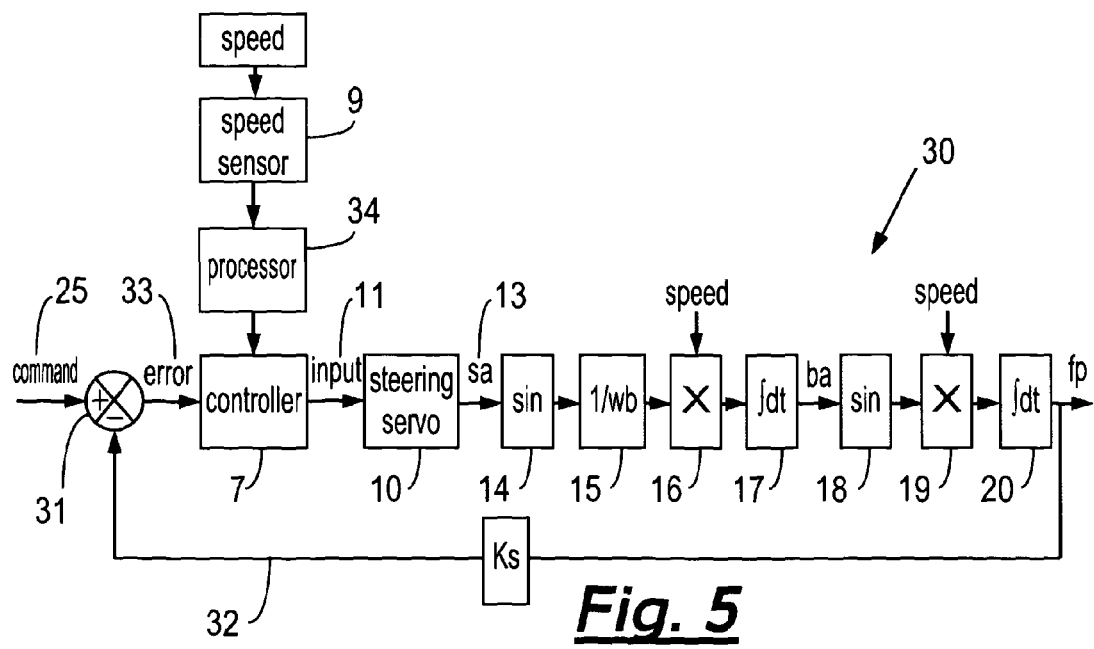
FIG. 5 presents a block diagram showing a method employed to control the position of the vehicle of FIG. 1 across the width of the track of FIG. 4.

A closed loop control system 30 for controlling the position of the vehicle 1 on the track 2 will now be described with reference to the block diagram of FIG. 5 and for a vehicle configured to travel anti-clockwise around the track 2.

The controller unit 7 is employed to receive the command signal 25 from the remote control unit 24. The speed control component of the command signal 25 is used to set the speed of operation of the dc electric motor 6 and hence the speed of the vehicle 1 while the track position component is employed by the steering servo (s) to set a desired lateral position for the first optical sensor 8 upon the track 2. For example, if the steering wheel 27 is in its zero position then the desired track position for the vehicle 1 is the centre of the track 2 and the vehicle 1 follow the lateral axis 28 along the full length of the track 2. If the steering wheel 27 is turned anticlockwise then a negative signal is generated which corresponding to a lateral track position closer to the inside of the track 2 i.e. a darker area of the track 2 which the vehicle 1 will then follows. Similarly, if the steering wheel 27 is turned clockwise then a positive signal is generated which corresponding to a track position closer to the outside of the track 2 i.e. a lighter area of the track 2 for the vehicle 1 to then follow. The track may therefore be considered to comprise a plurality of virtual slots for the vehicle 1 between which the vehicle 1 can easily move and the choice of which is determined by the track position component of command signal 25.

It will be appreciated by those skilled in the art that by inverting the above arrangement the vehicles 1 can be configured to operate in a clockwise direction around the track 2. In a further alternative embodiment, reversing the lateral graded shading of the track 2 would provide for a clockwise racing configuration.

A first subtractor 31 is then employed in a primary feedback path 32 for the steering servo (s) 10. The first subtractor 31 generates an error signal 33 that provides the input for the controller unit 7 by subtracting a primary feedback signal from the track position component of the command signal 25 and so allows for the controller unit 7 to provide a diagnostic of the deviation of the first optical sensor 8 from the desired lateral track position. The responsivity of a sensor is given by the relationship between its input and its output. In the presently described control system 30 the responsivity, denoted by Ks, is the relationship between the track positioned measured by the first optical sensor 8 and the output fed to the first subtractor 31. On receiving the error signal 33, the controller unit 7 then attempts to drive the steering servo (s) 10 so as to reposition the front of the vehicle 1 on the track 2 so as to minimise the error signal 33. In this way the vehicle 1 will travel around the track 2 while trying to maintain the lateral track position set by the track position component. If the track position component is changed then the vehicle 1 will then attempt to reposition itself on the track 2 to the corresponding new lateral position.

As described above, the rate at which the body angle (ba) increases at a given steering angle (sa) and the position of the front of the vehicle (fp) both depend on the speed of the vehicle 1. Thus the loop gain of the control system 30 depends upon the square of the speed of the vehicle 1. It is therefore extremely difficult to tune the controller unit 7 of the control system 30 so as to give a fast and stable response for all vehicle 1 speeds. By way of example, a 1:20 scale vehicle 1 employing a steering servo (s) 10 having a bandwidth of 10 Hz would typically have a mid range speed of 1.5 ms$^{-1}$. Although the control system 30 can be arranged to be stable at this speed of operation its stability quickly deteriorates as the vehicle's speed moves above or below this mid-range value.

A solution to this problem is to employ the output of the velocity sensor 9 so as to modify the input to the steering servo (s) 10 from the controller unit 7 and thus compensate for the speed dependency of the forward path gain of the control system 30. The simplest modification is to make the gain of the controller unit 7 vary with the reciprocal of the square of the speed of the vehicle 1. This is achieved by employing a processor unit 34 connected between the velocity sensor 9 and the controller unit 7. It is noted however that this solution results in very high controller gains at low vehicle speeds.

In an alternative embodiment the processor unit 34 is employed to vary the gain of the controller unit 7 with the reciprocal of the square of the speed of the vehicle 1 only when the vehicle 1 is travelling above a predetermined minimum speed e.g. in the above provided example a suitable minimum speed would be 0.5 ms$^{-1}$.

Second Optical Sensor Control System

In the absence of a further control method the dynamics of the control system 30 are set primarily by the response of the steering servo (s) 10 and thus this system is effectively a forth order, type two system. As is known to those skilled in the art such systems are not particularly stable, and so it can prove difficult for the control system 30 to keep the vehicle 1 on the track 2, without further compensation. An alternative embodiment will now be described wherein further stability compensation is achieved through the employment of a second optical sensor located within the vehicle.

Figure 6:
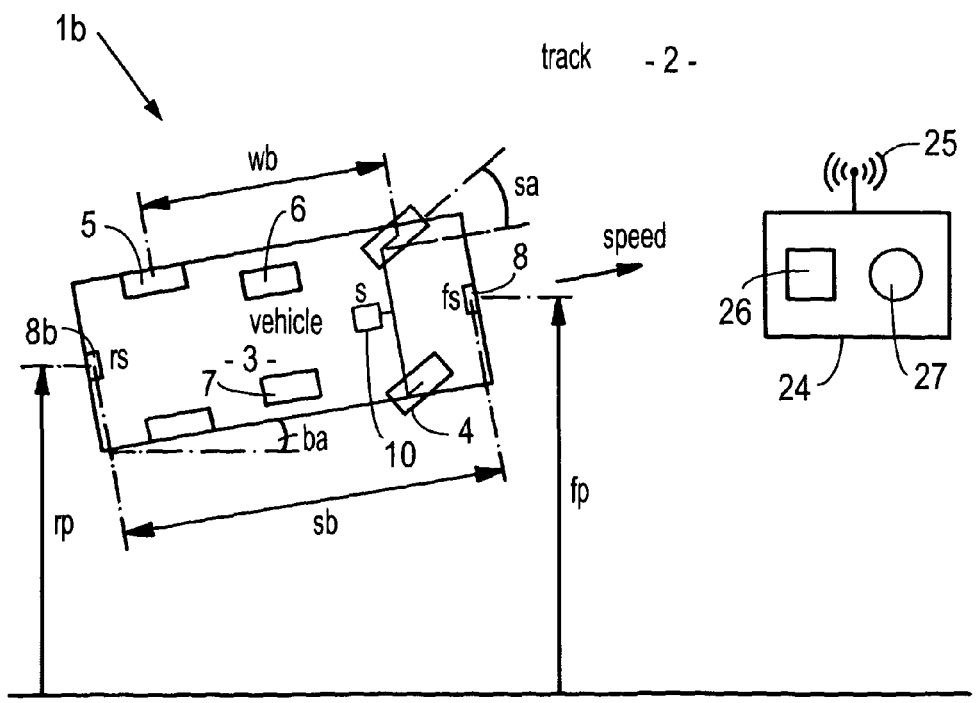
FIG. 6 presents a schematic representation of a vehicle in accordance with an alternative embodiment of the present invention.

A vehicle 1b that incorporates a second optical sensor is presented schematically in FIG. 6. The vehicle 1b can be seen to comprise many of the elements of the vehicle 1 presented in FIG. 1, namely: a main body 3, a set of steerable wheels 4, a set of non-steerable wheels 5, a dc electric motor 6, a controller unit 7, a first optical sensor 8 positioned at the front of the vehicle 1b, and a steering servo (s) 10. However, in the presently described embodiment a second optical sensor 8b is located at the rear of the vehicle 1b. Also in the presently described embodiment there is no requirement for the velocity sensor 9.

Figure 7:
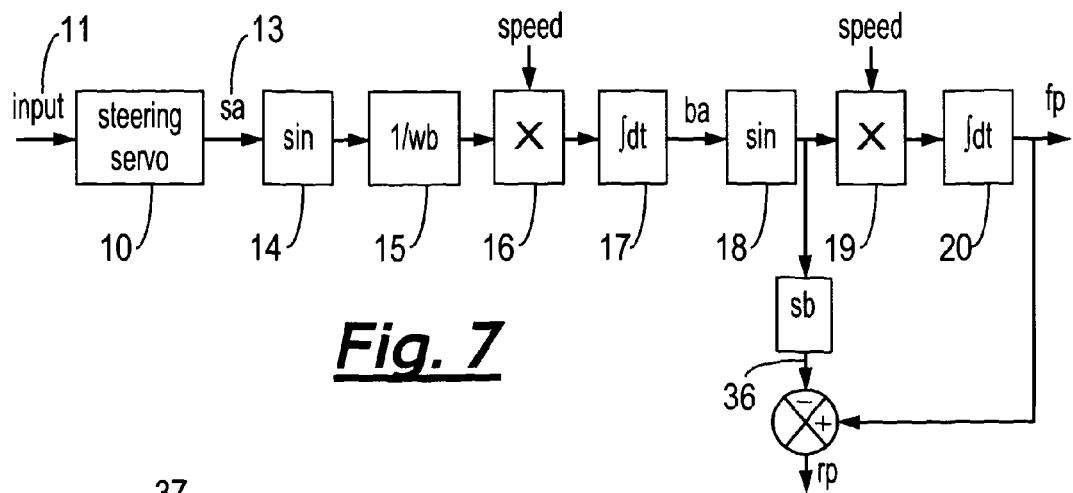
FIG. 7 presents a block diagram showing the response of the vehicle of FIG. 6 to steering commands.

FIG. 7 presents a block diagram 35 showing the response of the vehicle 1b of FIG. 6 to the command signal 25 generated by the remote control unit 24. The response block diagram of FIG. 7 is similar to that discussed above in connection with the response of the vehicle 1, and as presented in FIG. 2, with the exception that an arm 36 representing the position of the rear of the vehicle (rp) is now present.

Figure 8A:
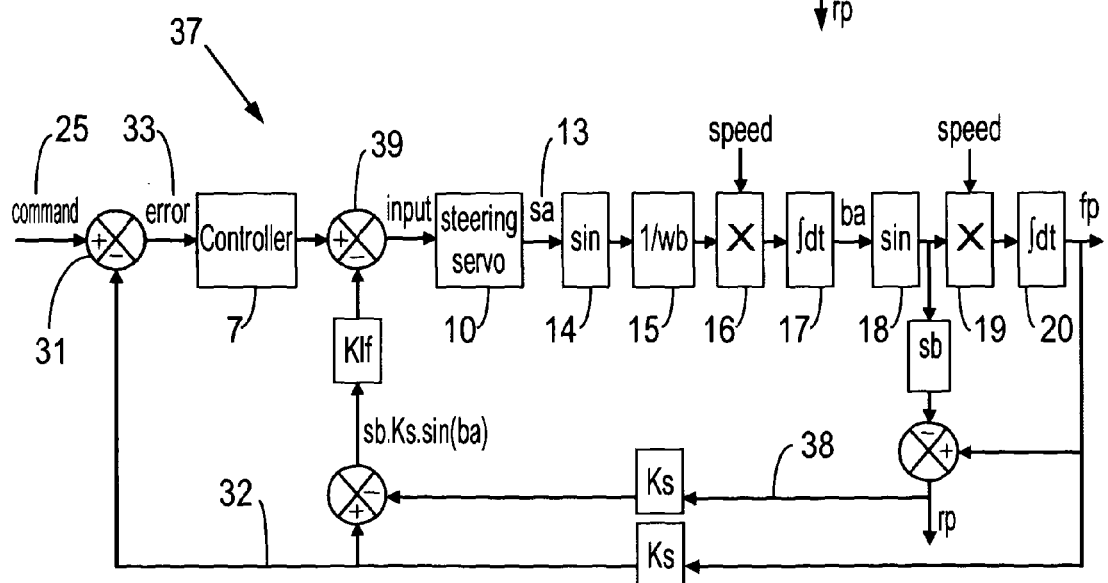
FIG. 8 presents:
(a) a first; and
(b) a second block diagram showing a method employed to control the position of the vehicle of FIG. 6 across the width of the track of FIG. 4.
Figure 8B:
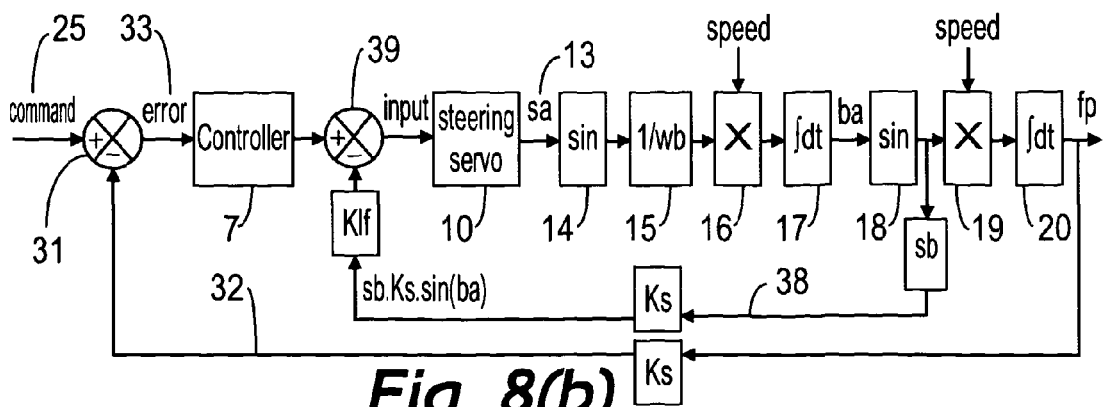

A closed loop control system 37 for controlling the position of the vehicle 1b upon the track 2 is presented by the block diagram of FIG. 8(a) and the equivalent block diagram of FIG. 8(b). The controller unit 7 is again employed to receive the command signal 25 from the remote control unit 24 so as to set the desired speed and position of the front of the vehicle 1b on the track 2. The first subtractor 31 is again employed in a primary feedback path 32 for the steering servo (s) 10 so as to generate an error signal 33 which provides a diagnostic of the deviation of the front of the vehicle 1 from the desired position. The responsivity of on the primary feedback path 32, is again denoted by Ks.

In addition, the control system 37 employs a secondary, or local, feedback path 38 to the steering servo (s) 10. The secondary feedback path 38 provides a second subtractor 39 located therein with the measured position of the rear of the vehicle (rp). The second subtractor 39 is configured to then provide a secondary feedback signal to the steering servo (s) 10 that equals the difference between the front and rear positions of the vehicle, namely (fp)−(rp).

With reference to FIG. 6, basic trigonometry shows us that the difference between the front (fp) and rear positions (rp) of the vehicle 1b on the track 2 is given by the sensor base (sb) multiplied by the sine of the body angle, or put another way:

$$((fp)-(rp))=(sb)\cdot\sin(ba) \qquad (1)$$

Therefore, by measuring the front (fp) and rear positions (rp) of the vehicle 1b on the track 2, and calculating the difference between these values, allows for a secondary feedback signal to the steering servo (s) 10 that is dependent upon the body angle (ba), rather than just the steering angle (sa). The secondary feedback loop thus acts to minimise the measured body angle so as to keep the vehicle 1b travelling parallel to the longitudinal axis 28 of the track 2.

In addition, since the first time integral block 17 is now contained within the secondary feedback loop this has the effect of converting this block so as to act as an exponential lag rather than a time integration. The control system 37 can therefore be considered a forth order, type one system which, as appreciated by those skilled in the art, is significantly more stable than a fourth order, type two system. Furthermore, the control system 37 also reduces the effects of speed on the stability of the system 37 since the part of the system that has a gain which changes with speed is now contained within the local feedback loop.

Figure 9:
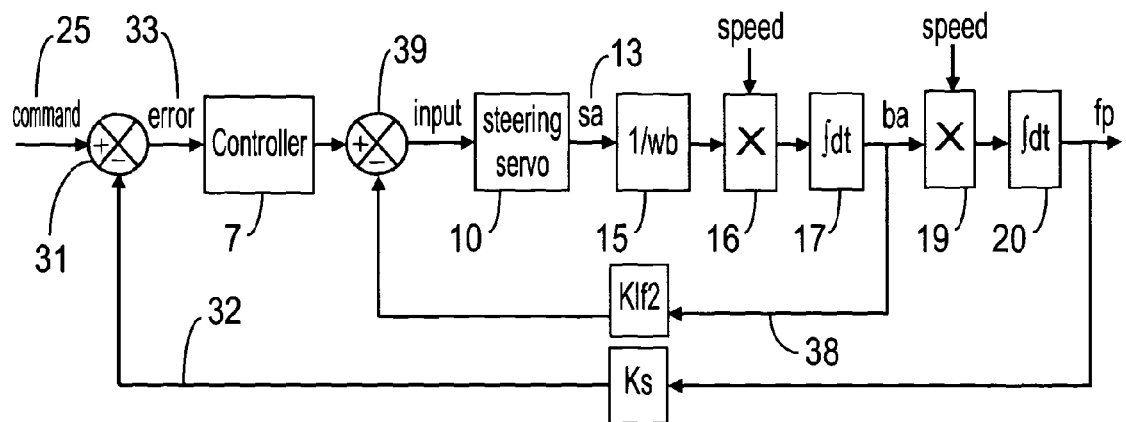
FIG. 9 shows a simplified block diagram of the method employed to control the position of the vehicle of FIG. 6 across the width of the track of FIG. 4.

It will also be appreciated by those skilled in the art that both the steering angle (sa) and body angle (ba) will be typically 30° or less. As a result a further simplification to the control system 37 can be made by exploiting the fact that for small angles θ, sin(θ) is approximately equals to θ. A simplified effective control system 37*a* is therefore presented by the block diagram of FIG. 9 wherein the first 14 and second 18 sine blocks are omitted.

In practice, it is found to be preferable for the stability of the control systems 37 and 37*a* if the responsivity on the of the secondary feedback path 38, Klf2, is made to be equal to the reciprocal of the responsivity (Kss) of the steering servo (s) 10. Together with the negation in the second subtractor 39 this results in the steering angle (sa) being set equal and opposite to the body angle (ba). The secondary feedback loop 38 thus makes the steerable wheels 4 point in the direction that the vehicle 1*b* should be travelling.

In the absence of the secondary feedback loop, if the front position of the vehicle (fp) were at the correct position, but the vehicle were at an angle to the track 2 then as soon as the vehicle 1*b* moved forward the front position of the vehicle (fp) would deviate from the desired position before the overall feedback eventually brought it back into line. With the addition of the second sensor 8*b* at the rear of the vehicle 1*b* and the secondary feedback path 38 the steerable wheels 4 are automatically pointed along the track 2 and as the vehicle 1*b* moves forward the rear position (rp) simply follows the front position (fp) to the correct position across the track 2. Thus it can be considered that the control systems 37 and 37*b* anticipate the impending positional error of the vehicle 1*b* and then takes the necessary action to correct this positional error before it occurs.

Velocity Sensor and Second Optical Sensor Control System

Figure 10:
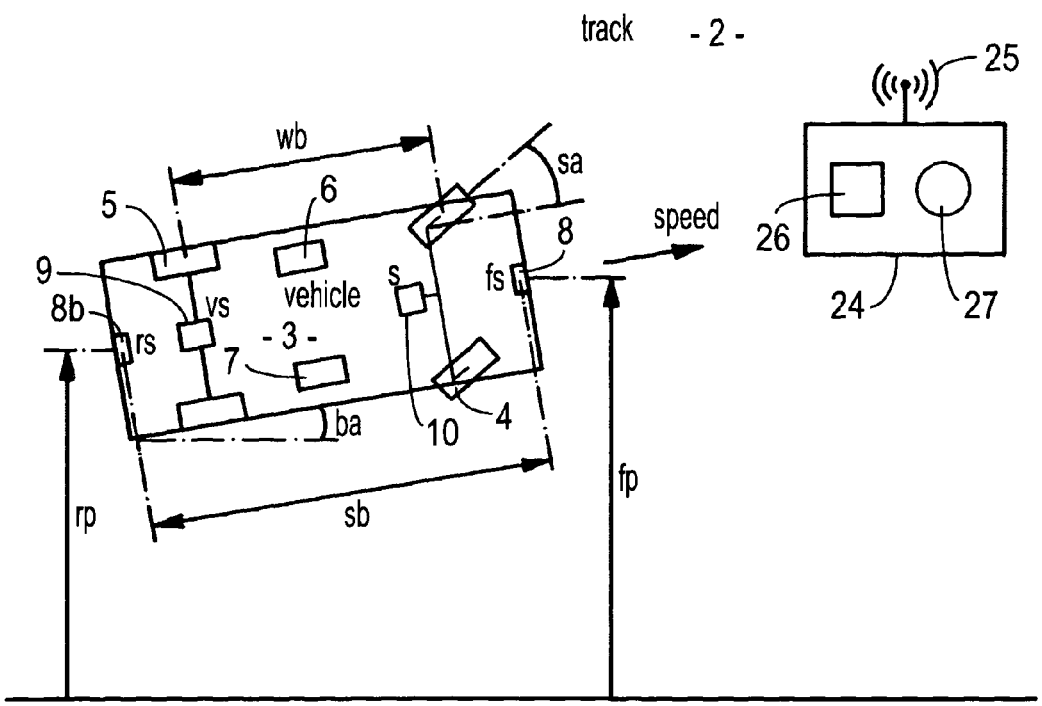
FIG. 10 presents a schematic representation of a vehicle in accordance with an alternative embodiment of the present invention.

In a preferable alternative embodiment the control system for the vehicle employs a combination of both of the above described control systems 30 and 37. By way of example, FIG. 10 presents a vehicle 1*c* that incorporates both the velocity sensor 9 and the second optical sensor 8*b*. The remaining elements of the vehicle 1*c* correspond to those presented in FIG. 1 and FIG. 6 in connection with the previously described vehicles 1 and 1*b* and are thus marked with corresponding reference numerals.

Figure 11:
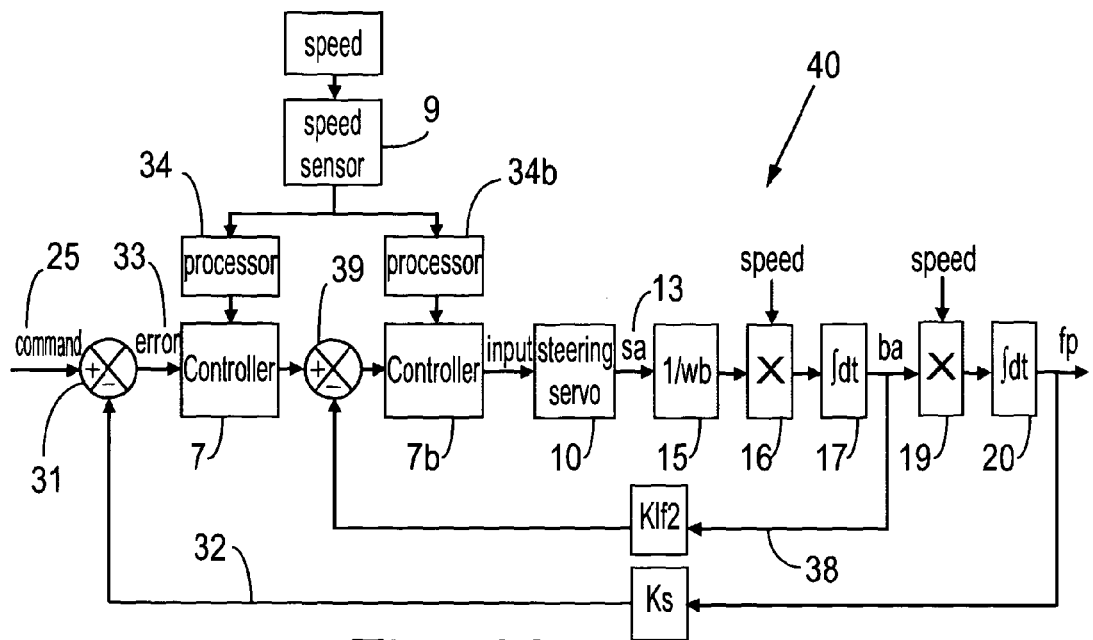
FIG. 11 presents a block diagram showing a first method employed to control the position of the vehicle of FIG. 10 across the width of the track of FIG. 4.

A first closed loop control system 40 for controlling the position of the vehicle 1*c* upon the track 2 is presented by the block diagram of FIG. 11. As with the previously described systems 30 and 37, the controller unit 7 is employed to receive the command signal 25 from the remote control unit 24 so as to set the desired speed and position of the front of the vehicle 1*c* on the track 2. The first subtractor 31 is then employed in a primary feedback path 32 to the steering servo (s) 10 so as to generate an error signal 33 which provides a diagnostic of the deviation of the front of the vehicle 1 from the desired position. The responsivity of the primary feedback path 32, is again denoted by Ks.

The secondary, or local, feedback path 38 again provides details of the position of the rear of the vehicle (rp) to the second subtractor 39 located between the first controller unit 7 and the steering servo (s) 10. The second subtractor 39 is again configured such that the secondary feedback loop acts to minimise the measured body angle of the vehicle 1*c* on the track 2. The responsivity of the secondary feedback path 38, Klf2, is again preferably made to be equal to the reciprocal of the responsivity (Kss) of the steering servo (s) 10. In order to provide a means for implementing velocity compensation within the secondary feedback loop it should be noted that a second controller unit 7*b* is located between the second subtractor 39 and the steering servo (s) 10.

In the presently described embodiment the gain of the primary feedback loop and the secondary feedback loop are modified by the controller units 7 and 7*b* so as to vary with the reciprocal of the speed of the vehicle 1*c*, rather than the reciprocal of the speed squared, as was required within the control system 30. This is however achieved in a similar manner, namely by employing processor units 34 and 34*b* connected between the velocity sensor 9 and the first and second controller units 7 and 7*b*, respectively.

In an alternative embodiment the processor units 34 and 34*b* may be is employed to vary the gain of the primary and secondary feedback loops via the controller units 7 and 7*b*, respectively, with the reciprocal of the speed of the vehicle 1*c* only when the vehicle 1*c* is travelling above a predetermined minimum speed.

Figure 12:
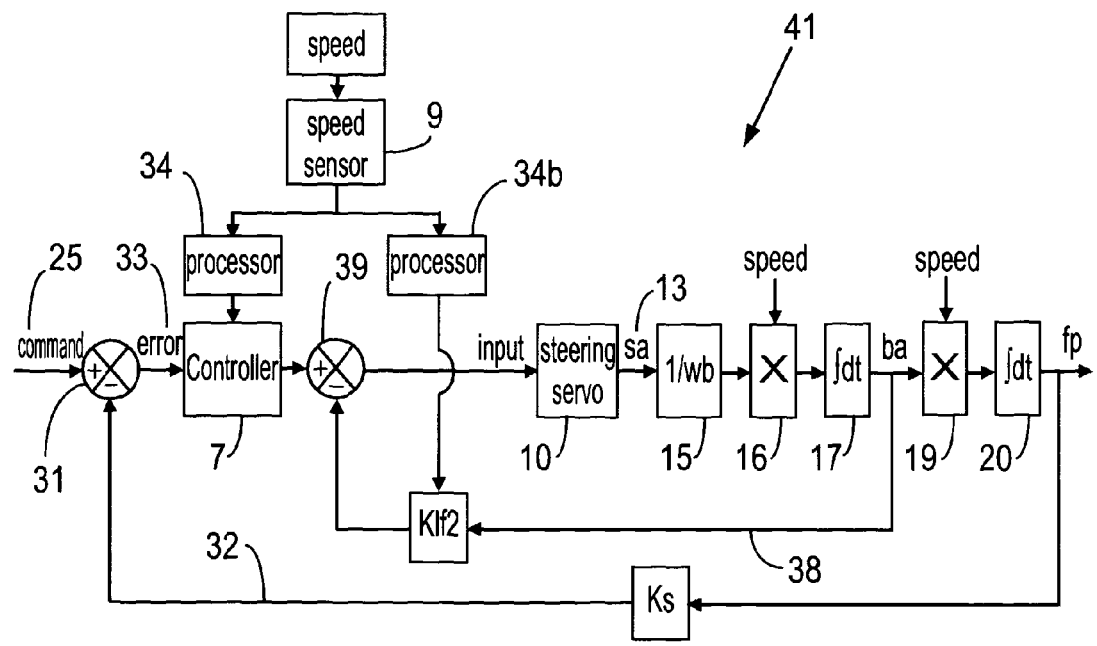
FIG. 12 presents a block diagram showing a second method employed to control the position of the vehicle of FIG. 10 across the width of the track of FIG. 4.

A second control system 41 for controlling the position of the vehicle 1*c* upon the track 2 is presented by the block diagram of FIG. 12. This embodiment is similar in many respects to the control system 40 presented in FIG. 11 and discussed in detail above. The one significant difference is that the second controller unit 7*b* is omitted such that the variation of the gain of the secondary loop is carried within the feedback path 38 itself. This is a less preferable solution since it requires different processing for the forward path controller 7 as changing the feedback path gain of the secondary feedback path 38 changes the closed loop response of the secondary loop, and thus changes the loop gain of the primary loop.

It will be appreciated by those skilled in the art that all in of the described embodiments the vehicles the steering servo may be adapted such that instead of varying the angle of the steerable wheels a change in direction of the vehicle is achieved by varying the relative rotation of the wheels.

Furthermore, it will be appreciated that although the controller units 7 and 7*b*, subtractors 31 and 39 and the processor units 34 and 34*b* have all been presented as separate units their functionality may be implemented directly with a single controller unit.

The racing vehicle game describe above offers many advantages over those games known on the art. In the first instance a slotless track and vehicle combination is provided whereby the lateral position of a vehicle can be varied such that it can move across the full width of the track. This provides a more realistic racing vehicle game since the operator of the vehicle can manoeuvre it in order to gain a tactical advantage (e.g. to overtake or nudge an opponent or to protect a racing line) but without having to steer the car around the track.

Secondly, if a vehicle does comes off of the track it can simply be driven back on and the operation of the control system for the vehicle on the track resumes. Thus, unlike slot cars there is no need for an operator to physically reposition their vehicle on the track in order for racing to resume.

The track itself also offers a number of significant advantages. In the first instance there is no limit to the number of vehicles that may be raced since there are no predetermined slots required for the operation of a vehicle. The track is highly flexible allowing for simple storage, transportation and deployment. The track is simple to produce and so significantly more cost effective than traditional slotted tracks known in the art. Finally the track allows for the incorporation of additional racing hazards such as oil slicks, track debris, gravel pits or variable weather conditions.

A method and apparatus for controlling the position of a vehicle on a track so as to provide a slotless racing vehicle game is described. The method involves measuring the lateral position of the vehicle on the track so as to minimise the distance with a user defined lateral position. A measured velocity of the vehicle is then feedback to a steering servo in order to stabilise the vehicle's position at the desired lateral position. In particular, the gain of a controller that generates the input signal for the steering servo is varied with the reciprocal of the square of the speed of the vehicle.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A method for controlling the position of a vehicle on a track wherein the method comprises the steps of:
    taking a first measurement of a lateral position of the vehicle on the track;
    comparing the first measured lateral position with a desired lateral position for the vehicle so as to produce an error signal;
    generating a first input signal for a steering servo of the vehicle so as to minimise the error signal;
    measuring the speed of the vehicle;
    employing the measured speed so as to compensate for speed dependent changes in a response of the vehicle to an output signal from the steering servo wherein the step of compensating for speed dependent changes in the response of the vehicle comprises varying the gain of a controller that generates the first input signal for the steering servo with the reciprocal of the square of the speed of the vehicle.

2. A method for controlling the position of a vehicle as claimed in claim 1 wherein the gain of the controller is varied with the reciprocal of the square of the speed of the vehicle when the speed of the vehicle is above a predetermined value.

3. A method for controlling the position of a vehicle as claimed in claim 1 wherein the step of taking the first measurement is carried out at the front of the vehicle.

4. A method for controlling the position of a vehicle as claimed in claim 1 wherein the step of taking the first measurement comprises employing an optical sensor so as to measure light reflected from the track.

5. A method for controlling the position of a vehicle as claimed in claim 1 wherein the step of measuring the speed of the vehicle comprises measuring the back emf generated by a motor employed to drive the vehicle.

6. A method for controlling the position of a vehicle as claimed in claim 1 wherein the method further comprise the step of measuring the angle between the direction of propagation of the vehicle and a longitudinal axis of the track.

7. A method for controlling the position of a vehicle as claimed in claim 6 wherein the method further comprises the step of generating a second input signal for the steering servo so as to minimise the measured angle.

8. A method for controlling the position of a vehicle as claimed in claim 6 wherein the step of measuring the angle between the direction of propagation of the vehicle and a longitudinal axis of the track comprises taking a second measurement of a lateral position of the vehicle on the track.

9. A method for controlling the position of a vehicle as claimed in claim 8 wherein the step of taking the second measurement is carried out at the rear of the vehicle.

10. A method for controlling the position of a vehicle as claimed in claim 8 wherein the step of taking the second measurement comprises employing an optical sensor so as to measure light reflected from the track.

11. A method for controlling the position of a vehicle as claimed in claim 8 wherein the step of measuring the angle between the direction of propagation of the vehicle and a longitudinal axis of the track further comprises taking the second measurement of the lateral position of the vehicle on the track from the first measurement of the lateral position of the vehicle on the track.

12. A control circuit for controlling the position of a vehicle on a track wherein the control circuit comprises:
    a first measurement sensor for measuring a first lateral position of the vehicle on the track;
    a subtractor employed to produce an error signal by comparing the first measured lateral position with a desired lateral position for the vehicle;
    a controller for generating a first input signal for a steering servo of the vehicle so as to minimise the error signal;
    velocity sensor for measuring the speed of the vehicle;
    wherein the controller provides a means for employing the measured speed so as to compensate for speed dependent changes in a response of the vehicle to an output signal from the steering servo wherein a gain of the controller is varied with the reciprocal of the square of the speed of the vehicle speed so as to compensate for speed dependent changes in the response of the vehicle to an output signal from the steering servo.

13. A control circuit as claimed in claim 12 wherein the gain of the controller is varied with the reciprocal of the square of the speed of the vehicle when the speed of the vehicle is above a predetermined value.

14. A control circuit as claimed in claim 12 wherein the control circuit further comprises a second measurement sensor for measuring the angle between the direction of propagation of the vehicle and a longitudinal axis of the track.

15. A control circuit as claimed in claim 14 wherein the controller generates a second input signal for the steering servo so as to minimise the measured angle.

16. A control circuit as claimed in claim 12 wherein the measurement sensor comprises an optical sensor having a light source and a detector.

17. A control circuit as claimed in claim 12 wherein the velocity sensor comprises a means for measuring the back emf of a motor employed to drive the vehicle.

18. A racing vehicle comprising a control circuit as claimed in claim 12.

* * * * *